(12) United States Patent
Menzel et al.

(10) Patent No.: US 6,502,315 B2
(45) Date of Patent: Jan. 7, 2003

(54) WORK APPARATUS HAVING A CENTRIFUGAL CLUTCH

(75) Inventors: Johannes Menzel, Stuttgart (DE); Helmar Amend, Waiblingen (DE)

(73) Assignee: Andreas Stihl AG & Co., Waiblingen (DE)

( * ) Notice: Subject to any disclaimer, the term of this patent is extended or adjusted under 35 U.S.C. 154(b) by 180 days.

(21) Appl. No.: 09/759,457

(22) Filed: Jan. 16, 2001

(65) Prior Publication Data

US 2001/0008045 A1 Jul. 19, 2001

(30) Foreign Application Priority Data

Jan. 15, 2000 (DE) .......................................... 100 01 511

(51) Int. Cl.⁷ .............................................. B27B 17/10
(52) U.S. Cl. ................... 30/381; 192/105 CD
(58) Field of Search .......................... 30/381, 383, 384; 192/105 CD

(56) References Cited

U.S. PATENT DOCUMENTS

| | | | | |
|---|---|---|---|---|
| 3,693,772 A | * | 9/1972 | Tani .................... | 192/105 CD |
| 3,849,884 A | * | 11/1974 | Arff ............................ | 30/383 |
| 3,970,178 A | * | 7/1976 | Densow ................. | 192/105 BA |
| 4,053,980 A | * | 10/1977 | Peohlman ..................... | 30/381 |
| 4,282,962 A | * | 8/1981 | St. John ................. | 192/105 CD |
| 4,446,954 A | * | 5/1984 | Weiss .................. | 192/105 CD |
| 5,341,907 A | * | 8/1994 | Yokocho et al. ....... | 192/105 CD |
| 5,774,993 A | * | 7/1998 | Schlessmann ................ | 30/276 |
| 6,005,519 A | * | 12/1999 | Becker et al. ........ | 192/105 CD |

* cited by examiner

Primary Examiner—Hwei-Siu Payer
(74) Attorney, Agent, or Firm—Walter Ottesen

(57) ABSTRACT

The invention relates to a portable handheld work apparatus such as a motor-driven chain saw, a cutoff machine, a brushcutter or the like. The work apparatus includes an internal combustion engine (1) mounted in a housing (2) which drives a work tool via centrifugal clutch (3). The centrifugal clutch (3) includes a carrier (5) driven by the engine (1). The carrier (5) has rpm-dependent displaceable centrifugal weights (6) which are displaceable against a return force and come into contact engagement against a contact wall (7) of an output part (8) so as to transmit-torque. A rotationally-elastic damping element (11) is arranged between the output part (8) and an intermediate element (10) connected to the tool (4) so as to rotate with the intermediate element (10).

20 Claims, 3 Drawing Sheets

WORK APPARATUS HAVING A CENTRIFUGAL CLUTCH

BACKGROUND OF THE INVENTION

Work apparatus such as chain saws, cutoff machines, brushcutters or the like include a drive train which, in turn, includes an internal combustion engine, a disconnect clutch and a tool which is driven by the engine in the engaged state of the disconnect clutch. This system includes a series of nonlinear elasticities such as the load-dependent changeable elasticity of a saw chain. The elasticity in combination with the mass of the drive train defines a system capable of vibration which is excited toward vibration because of torque fluctuations of the drive motor caused by nonuniformly worn cutting teeth or the like. Especially at operating rpm, disturbing subharmonic vibrations become noticeable at the handle of such a work apparatus. These vibrations cause the apparatus to vibrate and are transmitted to the handles. These handle vibrations reduce the comfort with which an operator works with the apparatus and can lead to a premature tiring of the operator. Furthermore, pulse-like force peaks occur in the drive train because of nonuniformities in the workpiece and/or because of errors in the use of the apparatus. These force peaks lead to a high loading of the components such as bearings and clutch entraining elements.

SUMMARY OF THE INVENTION

It is an object of the invention to provide a work apparatus wherein the working comfort of the apparatus is increased.

The portable handheld work apparatus of the invention includes a motor-driven chain saw, cutoff machine and a brushcutter. The work apparatus includes: a housing; an internal combustion engine mounted in the housing; a work tool; a centrifugal clutch interconnecting the engine and the work tool to permit the engine to drive the work tool; the centrifugal clutch including a carrier driven by the engine; a plurality of centrifugal weights mounted on the carrier; an output part having a contact wall adjacent the centrifugal weights; the plurality of centrifugal weights being mounted so as to be displaceable between a first position wherein the centrifugal weights are disengaged from the contact wall and a second position wherein the centrifugal weights are in torque-transmitting contact engagement with the contact wall; the centrifugal clutch further including means for resiliently biasing the centrifugal weights into the first position; an intermediate member connected to the work tool so as to cause the work tool to rotate therewith; and, a rotationally-elastic damping element disposed between the intermediate member and the output part so as to operatively connect the intermediate member and the output part to each other.

The vibration system of the drive train is adapted in a simple manner and so as to save space and weight such that the subharmonic vibration excitation is reduced at operating rpm by the assembly of the centrifugal clutch with an output part, an intermediate element and a rotation-elastic damping element arranged between the output part and the intermediate element. In this way, the level of vibration at the handle is significantly reduced and the operating comfort of the work apparatus is thereby increased. A work apparatus configured in accordance with the invention is also more insensitive to vibration excitation because of nonuniformly worn rotatable work tools such as knives in the case of a brushcutter or the like. Because of the increased tolerance of the system against vibration excitation, harder anti-vibration elements are possible between the engine and the handle which makes guidance stiffer. In this way, the precision of the guidance of the work tool by the operator is improved. Furthermore, the dynamic load on the bearings and on the clutch is reduced and therefore a premature wear is prevented.

A rigid coupling of the drive part of the clutch to the engine is provided by the arrangement of the damping element on the output end of the centrifugal clutch. In this way, the spring element is ineffective in the disengaged state of the clutch and the rigidly connected mass of the drive part can, as a balancing mass, contribute to a quiet running of the engine in idle.

In a preferred embodiment of the invention, the output part in the centrifugal clutch is configured as a cylinder ring which, on its periphery, has one or several damping elements and is thereby connected rotationally elastically to the clutch drum. The cylinder ring assumes the function of the peripheral wall of a conventional clutch drum and transmits the torque by means of the peripherally arranged damping elements to the clutch drum enclosing the cylinder ring and the damping elements. The clutch drum is enlarged correspondingly with respect to diameter. The clutch drum defines the intermediate member for the rotationally fixed connection, for example, of the chain sprocket of a chain saw or of the tension flange for the drive shaft of a brushcutter. With this arrangement, no additional structural space in the axial direction is required for the damping elements. Furthermore, the damping elements can be easily and simply configured because they are arranged close to the periphery with a large radius and therefore are loaded relatively little.

To avoid an additional journalling of the cylinder ring, the cylinder ring preferably includes radial ribs which project outwardly and are distributed uniformly in the peripheral direction. These ribs are supported against the inner side of the peripheral wall of the clutch drum. A uniform centering of the cylinder ring without further journalling is given especially in combination with radial ribs of the peripheral wall of the clutch drum which extend inwardly and which, in turn, are supported against the cylinder ring. The ribs serve also to support the damping elements whereby additional devices to connect the same are unnecessary.

The damping elements are preferably configured as flat springs and especially as meander-shaped wire springs which are braced with their ends against corresponding ones of the ribs. In this way, only a small structural height is required in the radial direction. The spring and damping characteristics can be adjusted with simple means within wide limits with the selection of the wire thickness, number and form of the meander-shaped angles as well as sheet metal strips or plastic strips placed optionally in the angles of the spring. This adjustment of the spring and damping characteristics is achieved without it being necessary to change the main dimensions of the coupling cylinder and the clutch drum. An adaptation of the peripheral end applied force on the wire springs and therefore a friction damping can be adjusted in a simple manner via the selection of different bending radii in the peripheral direction.

The damping elements are built in purposefully with a pretensioning in such a manner that they, in the unloaded state of the disconnect clutch, press the ribs of the cylinder ring against the ribs of the clutch drum in opposition to the direction of rotation. In this way, a rigid and therefore precise connection of the tool to the engine is provided during operation at low torque. The pretensioning force of the spring element is overcome when torque peaks caused by vibration are present and thereby the torque behavior is smoothed.

In an advantageous embodiment, the intermediate member is arranged in the form of a disc at the end face toward the clutch drum. The clutch drum is here configured as the output part. The damping elements are provided in the axial direction between the end wall of the clutch drum and the disc. In this way, no additional radial structural space is needed for the wire elements so that, if necessary, present clutches and apparatus housings require only minor constructive retrofitting and, if required, even a retrofit of already manufactured work apparatus is possible.

Lugs are arranged on a circle on the end wall of the clutch drum and, opposite thereto, on the output part. These lugs are connected by means of the damping elements. These damping elements too are preferably configured as flat springs and especially as meander-shaped springs. In this way, a simple assembly without tools is possible while at the same time requiring little space.

The two groups of lugs can be advantageously connected by means of wire springs because of the arrangement of a number of lugs on a circular line close to the periphery of the clutch and a corresponding number of lugs arranged along a circular line of lesser radius. These two groups can be connected in that, on the one hand, a high carrying capacity is given by the large radius and, on the other hand, a high number of wire springs can be accommodated because of the radial offset. Twice the number of bolts is provided on the outer circle compared to the number of bolts on the inner circle in order to reduce the number of parts. Two bolts of the outer circle are connected via a double spring clamp to a corresponding one of the bolts of the inner circle. In this way, a high carrying capacity can be obtained while simultaneously having a reduced number of parts and therefore a reduced complexity with respect to manufacture and assembly. The damping elements are preferably configured as steel springs permanently fixed with respect to vibration whereby a high carrying capacity is combined with reduced maintenance costs.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
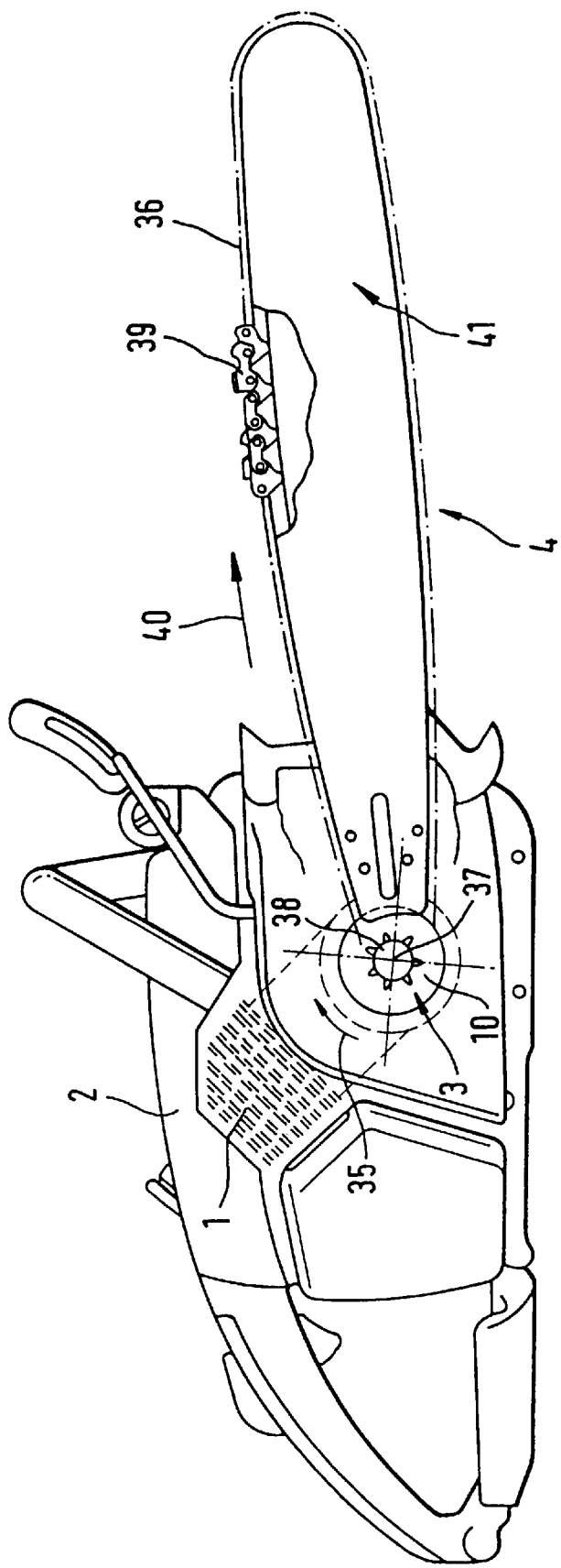
FIG. 1 is a schematic of a work apparatus in the form of a chain saw in accordance with the invention.

FIG. 1 shows a chain saw of the invention. The chain saw includes an internal combustion engine 1 mounted in a housing 2 and a work tool 4 in the form of a saw chain 36. The engine 1 rotates a centrifugal clutch 3 about a rotational axis 37 with the centrifugal clutch having an intermediate element 10 at the output end thereof. The saw chain 36 can be connected via the centrifugal clutch 3 to the engine 1 so as to transmit torque. In the coupled state of the centrifugal clutch 3, a chain sprocket 38 rotates in the rotational direction shown by the arrow 35. The chain sprocket 38 is connected to the intermediate element 10. The chain links 39 are hooked into the chain sprocket 38 and are thereby moved about the guide bar 41 in the direction of arrow 40.

Figure 2:
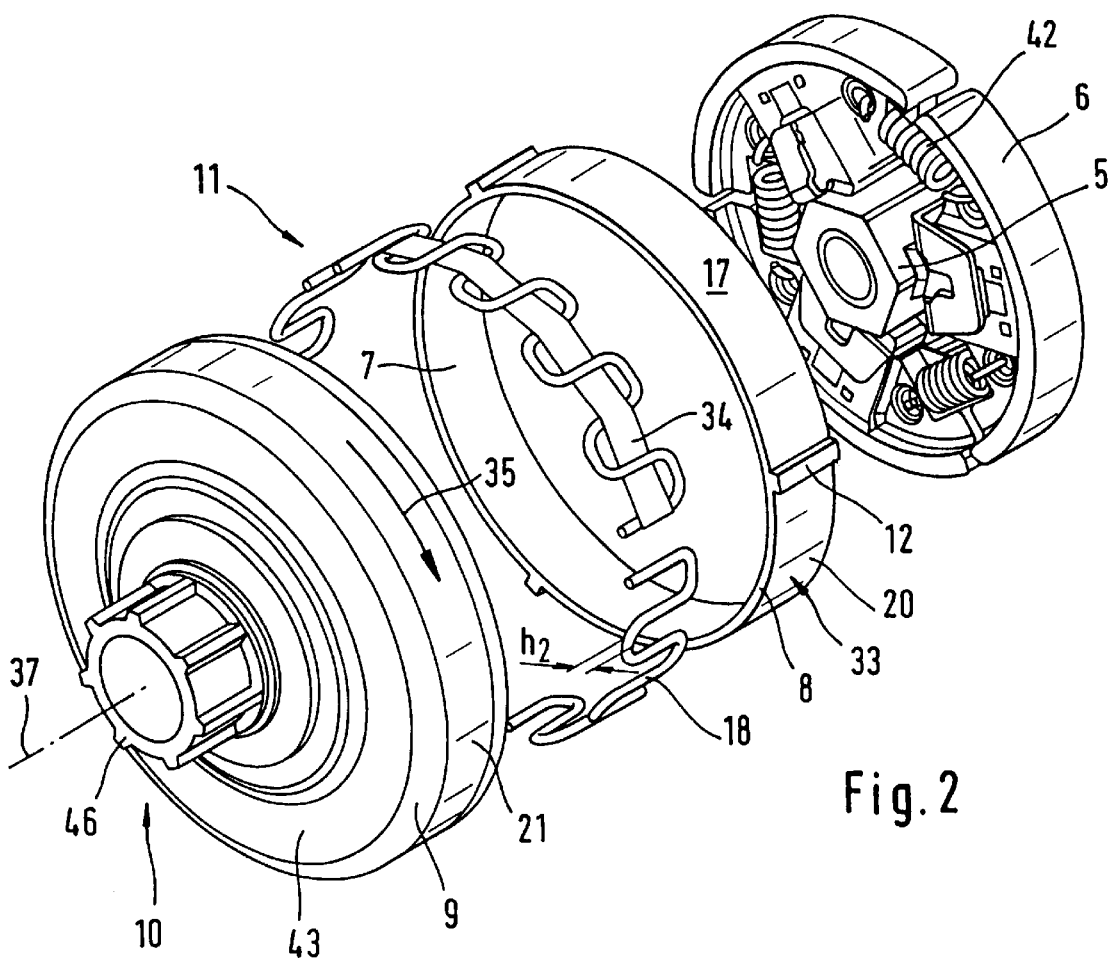
FIG. 2 is an exploded view of the disconnect clutch of the chain saw of FIG. 1.

The centrifugal clutch 3 of FIG. 1 includes a carrier 5 at the engine end thereof as shown in FIG. 2. Three centrifugal weights 6 are mounted on the carrier 5 so as to rotate therewith and are mounted so that they can be displaced radially outwardly against the spring force of the helical springs 42. An output part 8 in the form of a cylinder ring 20 is mounted at the periphery of the centrifugal weights 6. The cylinder ring 20 has an inner contact wall 7 against which the centrifugal weights 6 can come into contact engagement for transmitting torque. Three entrainers 12 in the form of ribs are arranged on the outer side 33 of the cylinder ring 20. These ribs 12 are uniformly distributed over the periphery of the cylinder ring 20 and extend radially outwardly as shown.

The damping elements 11 are configured as wire springs 18 in the embodiment shown and are arranged between the outer side 33 of the cylinder ring 20 and the inner side 31 (FIG. 3) of the clutch drum 9. The wire springs 18 are formed as flat springs and are bent to have a meander shape. The flat springs extend in an arcuate plane 17 which lies approximately parallel to the contact wall 7. In one of the flat springs 18, a sheet metal strip 34 is laid into the spring to increase the friction damping. In lieu of the sheet metal strip 34, a plastic strip or the like can also be used.

Figure 3:
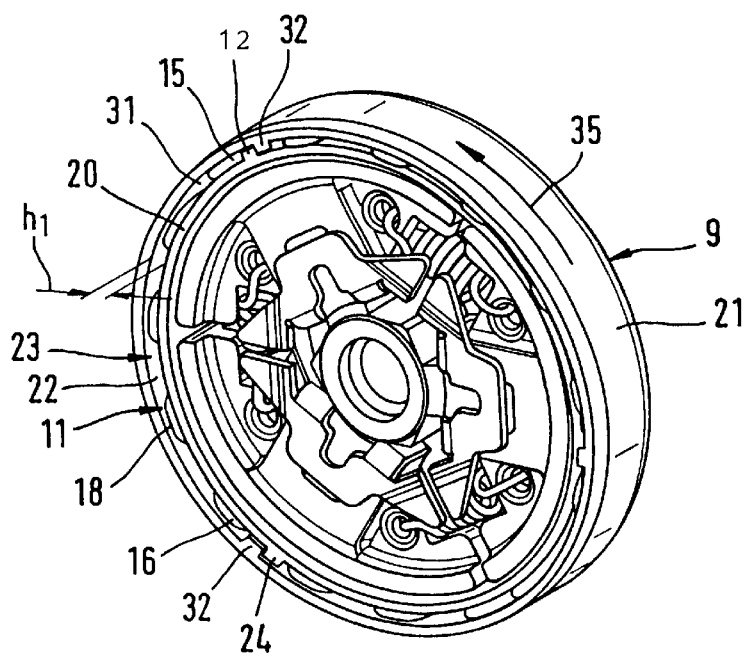
FIG. 3 is a perspective view of the disconnect clutch of FIG. 2 in the assembled state.

The damping elements 11 are held in the tangential direction by the ribs 12 and the ribs 32 shown in FIG. 3 whereby the clutch drum 9 is rotationally-elastically spring connected to the cylinder ring 20 and, in the engaged state, is also connected to the carrier 5, that is, to the engine 1. The intermediate element 10 is defined by the clutch drum 9 in this embodiment of the invention. A pinion receptacle 46 is arranged on the end wall 43 of the clutch drum 9 for connecting the chain sprocket 38 (FIG. 1) so that the chain sprocket rotates with the clutch drum 9. The chain sprocket 38, the clutch drum 9, the damping elements 11, the cylinder ring 20 and the support 5 are coaxially arranged to the rotational axis 37.

In FIG. 3, the assembled centrifugal clutch 3 of FIG. 2 is viewed perspectively from the engine end. The peripheral wall 21 of the clutch drum 9 engages over the cylinder ring 20 with a radial spacing. In this way, an accommodating space 23 in the form of an annular space 22 is formed for the damping elements 11. The ribs 12 of the cylinder ring 20 lie slidingly against the inner side 31 of the peripheral wall 21 of the clutch drum 9. At the inner side 31 of the peripheral wall 21, there are three projecting ribs 32 provided which extend radially inwardly. These ribs 32, in turn, lie in sliding contact with the outer side 33 (FIG. 2) of the cylinder ring 20. The damping elements 11 lie within the clutch drum 9 in an accommodation space 23 delimited by the inner side 31 of the intermediate element 10 and the outer side 33 of the cylinder ring 20 which, in this embodiment, defines an output part 8. The height $h_1$ of the accommodating space 23 corresponds approximately to the radial height $h_2$ (FIG. 2) of the damping elements 11.

Figure 4:
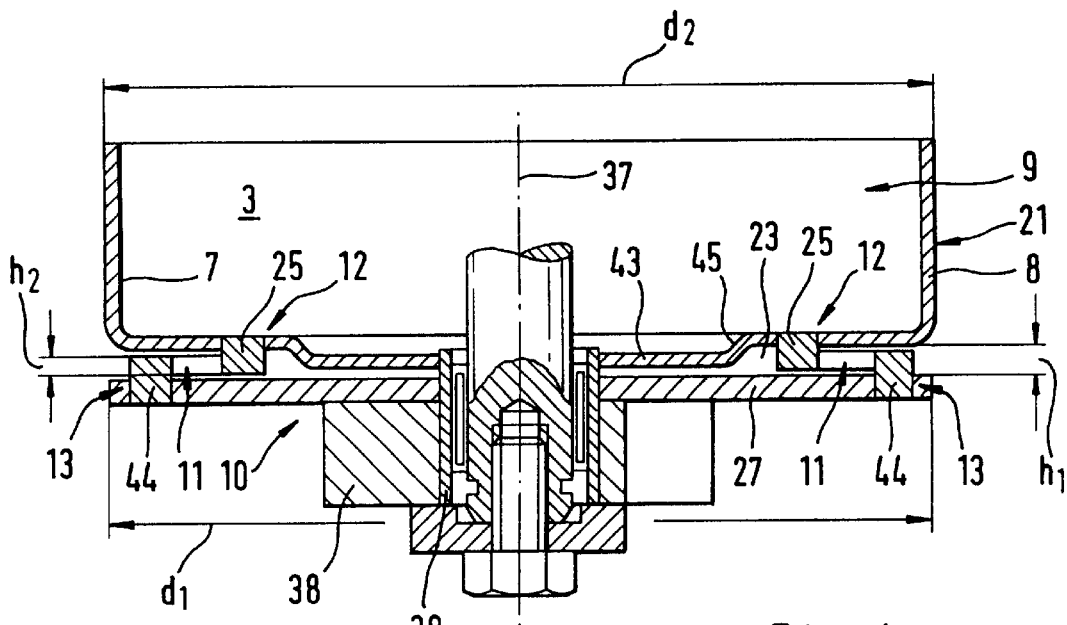
FIG. 4 is an alternate embodiment of the disconnect clutch shown in the chain saw in FIG. 1 in transverse cross section; and, FIG. 5 is a schematic representation of the arrangement of the spring elements of the disconnect clutch of FIG. 4.
Figure 5:
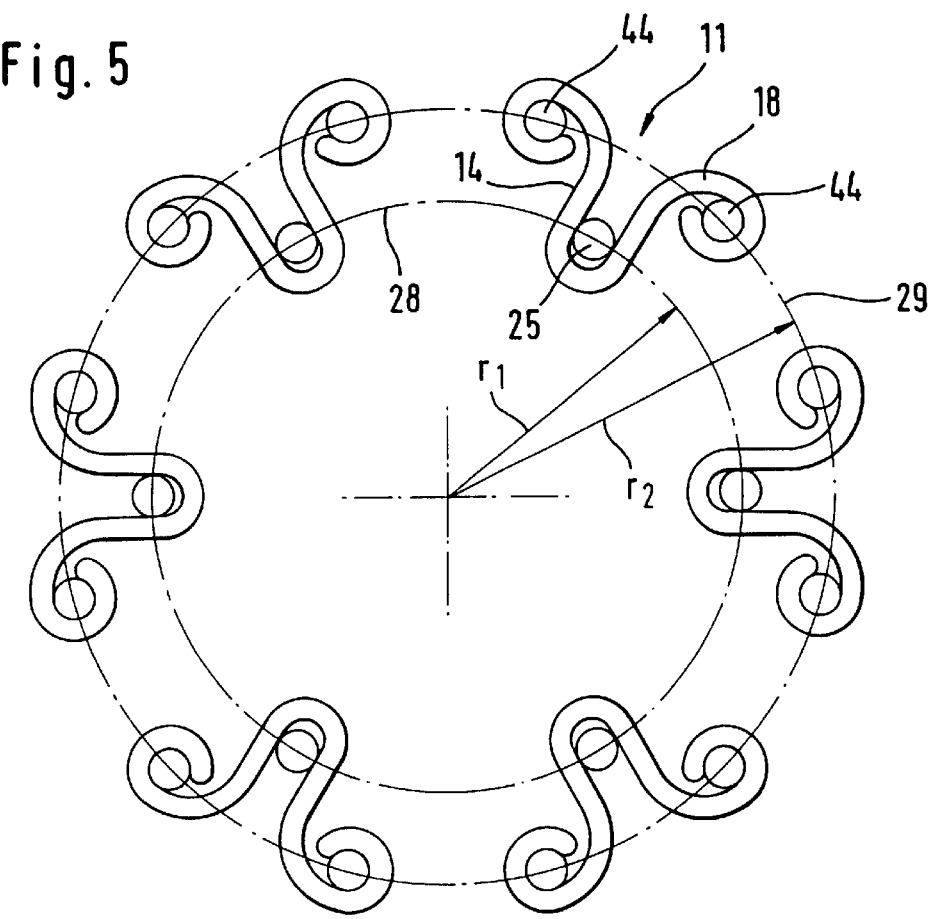

The spring wires 18 are arranged between respective ones of ribs 24 and ribs 12 and at one end 15 thereof, each of the wire springs 18 is braced against a particular rib 12 and, at the other end 16 thereof, against a rib 32 under a tangential pretension and is thereby also fixed. In the unloaded state of the centrifugal clutch 3, the ribs 12 are pressed against the ribs 32, respectively, in a direction opposite to the rotational direction 35 because of the pretensioning. Embodiments with more than three damping elements 11 and entrainers (12, 13) are also possible as shown in FIGS. 4 and 5. An embodiment can be purposeful wherein a rib 12 is held by two damping elements 11 arranged on both sides approximately midway between two ribs 32.

In the embodiment of the centrifugal clutch 3 shown in FIG. 4, the carrier 5 with the centrifugal weights 6 is not shown to facilitate a better overview. The contact engaging wall 7 is defined by the peripheral wall 21 of the clutch drum 9. The clutch drum 9, in turn, defines the output part 8. The end wall 43 of the clutch drum 9 is arranged so as to be approximately perpendicular to the rotational axis 37 and includes a number of entrainers 12. These entrainers 12 in the form of axial lugs 25 are arranged in a circular format on circle 28 as shown in FIG. 5. The intermediate element 10 is arranged at the end wall 43 of the clutch drum 9 with a disc 27 and the chain sprocket 38 is connected so as to rotate therewith. The disc 27 has a diameter $d_1$ which corresponds approximately to the diameter $d_2$ of the clutch drum 9. A number of lugs 44 is provided on the disc 27 which is aligned parallel to the end wall 43. The lugs 44 are provided along a circular line 29 close to the periphery of the disc and correspond to the lugs 25. The lugs 44 define the entrainers 13 at the output end. In the end wall 43, an annular step 45 is formed concentric to the rotational axis 37 via which an accommodating space 23 is provided having an axial height $h_1$ for the lugs 25 and 44 as well as the connecting damping elements 11. The damping elements 11 have a height $h_2$ which corresponds approximately to the height $h_1$ of the accommodating space 23. The disc 27 is rotatably journalled on a hub 30 of the clutch drum 9 and is connected rotationally elastically to the clutch drum 9 by means of the damping elements 11.

As shown in FIG. 5, the lugs 44 are arranged on a peripheral circle 29 having a radius $r_2$. The peripheral circle 28, on which the lugs 25 are arranged, has a radius $r_1$ which is less than the radius $r_2$. The number of lugs 25 and lugs 44 can be selected in dependence upon the occurring operating load. A particular one of the lugs 44 can be connected to a corresponding lug 25 via a damping element 11.

In the embodiment shown, six lugs 25 and twelve lugs 44, are provided. Each two lugs 44 are connected via a flat spring 14 in the form of a meander-shaped bent spring wire 18 to a lug 25 in a form-tight manner. An arrangement can also be advantageous wherein the clutch drum end lugs 25 are arranged on a circular line having the larger radius $r_2$ and, correspondingly, the output end lugs 44 are arranged on the circular line having the smaller radius $r_1$. The damping elements 11 of the embodiments shown are made of spring steel permanently resistant to continuous vibration.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
a housing;
an internal combustion engine mounted in said housing;
a work tool;
a centrifugal clutch interconnecting said engine and said work tool to permit said engine to drive said work tool;
said centrifugal clutch including a carrier driven by said engine;
a plurality-of centrifugal weights mounted on said carrier;
an output part having a contact wall adjacent said centrifugal weights;
said plurality of centrifugal weights being mounted so as to be displaceable between a first position wherein said centrifugal weights are disengaged from said contact wall and a second position wherein said centrifugal weights are in torque-transmitting contact engagement with said contact wall;
said centrifugal clutch further including means for resiliently biasing said centrifugal weights into said first position;
an intermediate member connected to said work tool so as to cause said work tool to rotate therewith; and,
a rotationally-elastic damping element disposed between said intermediate member and said output part so as to operatively connect said intermediate member and said output part to each other.

2. The portable handheld work apparatus of claim 1, said output part having first entraining means and said intermediate member having second entraining means; and, said damping element being mounted between said first and second entraining means.

3. The portable handheld work apparatus of claim 2, said damping element having a first end braced against said first entraining means and a second end braced against said second entraining means.

4. The portable handheld work apparatus of claim 3, wherein said damping element is fixed with said first and second ends against said first and second entraining means, respectively.

5. The portable handheld work apparatus of claim 4, wherein said first and second ends are connected force tight to said first and second entraining means, respectively.

6. The portable handheld work apparatus of claim 5, wherein said damping element is pretensioned between said first and second entraining means.

7. The portable handheld work apparatus of claim 6, wherein said damping element is configured as a flat spring made of spring wire bent to define a meandering shape.

8. The portable handheld work apparatus of claim 7, wherein a plurality of said damping elements is arranged so as to be connected in parallel and disposed in the peripheral direction of said centrifugal clutch.

9. The portable handheld work apparatus of claim 8, wherein said output part and said intermediate member conjointly define a receiving space therebetween for accommodating said damping elements therein; said receiving space having a first height ($h_1$) and said damping elements having a second height ($h_2$); said first height ($h_1$) corresponding approximately to said second height ($h_2$); and, said intermediate member defining a clutch drum with said damping elements being disposed to lie within said clutch drum.

10. The portable handheld work apparatus of claim 9, wherein said output part is a cylindrical ring and said clutch drum has a peripheral cylindrical wall extending over said cylindrical ring; said cylindrical ring being spaced from said peripheral cylindrical wall by a distance (a); and, said peripheral cylindrical wall and said cylindrical ring conjointly defining said receiving space therebetween.

11. The portable handheld work apparatus of claim 10, said first entraining means including a plurality of radially extending ribs formed on said cylindrical ring and said second entraining means including a plurality of radially extending ribs formed on said peripheral cylindrical wall of said clutch drum.

12. The portable handheld work apparatus of claim 11, wherein said peripheral cylindrical wall of said clutch drum has an inner wall surface; and, said ribs of said cylindrical ring are in sliding contact engagement with said inner wall surface so as to be braced there against.

13. The portable handheld work apparatus of claim 12, wherein said plurality of ribs, of said second entraining means formed on said inner wall surface and being in contact engagement with said cylindrical ring.

14. The portable handheld work apparatus of claim 13, wherein said cylindrical ring has an inner wall surface against which said centrifugal weights act when in said second position; and, said flat springs extend in an arcuate plane which is approximately parallel to said inner wall surface of said cylindrical ring.

15. The portable handheld work apparatus of claim 9, wherein a sheet metal strip is inserted into said spring wire of said flat spring.

16. The portable handheld work apparatus of claim 9, wherein said flat spring is pretensioned to provide a pretensioning force; and, said first entraining means is pressed by said pretensioning force against said second entraining means in a direction opposite to the direction of rotation of said centrifugal clutch drum when said centrifugal clutch is in its rest position.

17. The portable handheld work apparatus of claim 2, wherein said intermediate member is a clutch drum-having a peripheral cylindrical wall defining said output part; said peripheral cylindrical wall having an inner wall surface against which said centrifugal weights act to transmit torque when in said second position; said intermediate member being a disc; said clutch drum having an end wall facing toward said disc; and, said end wall and said disc conjointly define a receiving space therebetween for accommodating said damping element; and, said first and second entraining means project axially into said receiving space to coact with said damping element.

18. The portable handheld work apparatus of claim 17, wherein said first entraining means is a first plurality of lugs formed on said end wall of said clutch drum and arranged on a first circle having a first radius; and, said second entraining means is a second plurality of lugs formed on said disc and arranged on a second circle having a second radius different from said first radius.

19. The portable handheld work apparatus of claim 18, wherein the number of lugs on the circle having the larger radius is twice in number than the number of lugs on the circle having the smaller radius; and, wherein said centrifugal clutch includes a plurality of said damping elements and each of said damping elements connecting two of said lugs on the circle of larger radius to one of said lugs on the circle of smaller radius.

20. The portable handheld work apparatus of claim 19, wherein said disc has a first diameter ($d_1$) and said clutch drum has a second diameter ($d_2$) and said first diameter ($d_1$) corresponding approximately to said second diameter ($d_2$); said clutch drum having a hub formed on said end wall thereof; and, said disc being rotatably mounted on said hub so as to be able to rotate relative to said clutch drum.

* * * * *